United States Patent [19]
Finkel

[11] Patent Number: 4,457,222
[45] Date of Patent: Jul. 3, 1984

[54] KITCHEN UTENSIL
[76] Inventor: Menashe Finkel, 665 Ocean Pkwy., Brooklyn, N.Y. 11230
[21] Appl. No.: 435,644
[22] Filed: Oct. 21, 1982
[51] Int. Cl.³ .............................................. B26B 3/04
[52] U.S. Cl. ..................................... 99/494; D7/147; 30/279 R; 30/300; 99/538
[58] Field of Search ............... 99/494, 532; 30/279 R, 30/282, 300, 347, 310, 276; 83/856, 652, 425.1, 591, 698; D7/147, 106

[56]  References Cited
U.S. PATENT DOCUMENTS

D. 266,897 11/1982 Reid ..................................... D7/147
2,257,202 9/1941 Taylor .
2,263,531 11/1941 Kevorkian .
2,683,312 7/1954 Dover .
4,073,060 2/1978 Hendricks ......................... 30/279 R Primary Examiner—Timothy F. Simone
Attorney, Agent, or Firm—Ladas & Parry

[57]  ABSTRACT

A kitchen utensil has threaded end portion, a substantially straight middle portion connected to the threaded end portion and a plain portion disposed at an angle to the middle portion. A cutting member with a front cutting edge, a back edge and an aperture going therethrough from the front cutting edge to the back edge is attached to the threaded end portion in such manner that an axis of the aperture is substantially parallel to the directions of the threads.

5 Claims, 6 Drawing Figures

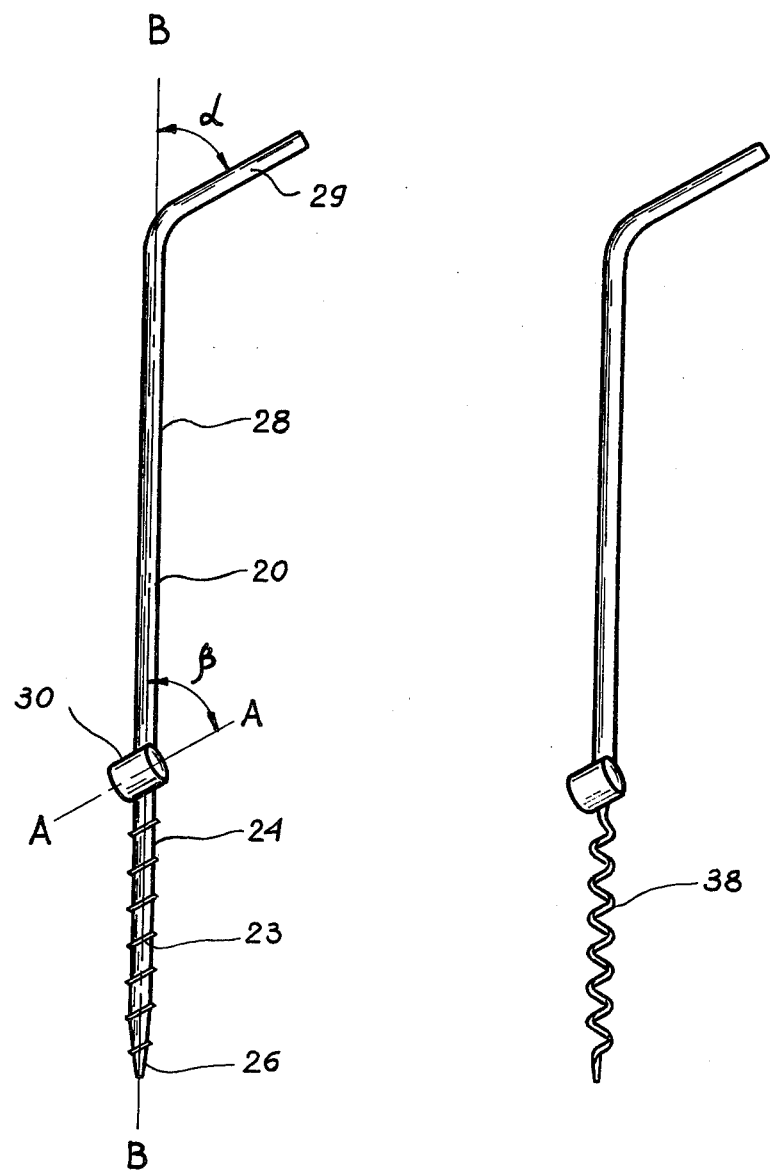

KITCHEN UTENSIL

BACKGROUND OF THE INVENTION

The present invention relates to a kitchen utensil. More particularly, the instant invention relates to a novel and improved kitchen implement for preparation of stuffed vegetables and fruits. The present invention relates to a novel kitchen implement for slicing of any solid vegetable, fruit or cheese and for preparation of spirals from these objects for garnishing of dishes as well.

Stuffed vegetables and fruits are well known in a food preparation. In preparation of vegetables and fruits which have to be stuffed an inside part of a product which has to be removed during a development of a hollow part is usually thrown out and is not used for a further cooking.

Spirals of vegetables and fruits which are prepared with a use of conventional kitchen implements for garnishing of dishes are thin and fragile to be used for decoration of dishes.

SUMMARY OF THE INVENTION

The general object of the present invention is to provide an improved kitchen utensil which will facilitate a preparation of a hollow portion in a vegetable or fruit which has to be stuffed.

Another object of the invention is to provide a kitchen utensil which will allow to use a removed part of an objectt which has to be stuffed for making an attractive and appetizing garnish for dishes.

A further object of the invention is to provide a kitchen utensil which will allow to make a strong and reliable spirals of different configuration from any solid vegetable, fruit or cheese.

These and other novel features and advantages of the present invention will be described and defined in the following specification and claims.

BRIEF DESCRIPTION OF THE DRAWINGS

A better understanding of the kitchen utensil will be had by referring to the accompanying drawings which should be considered as an example of this structure only.

FIG. 1 is a side elevation of the kitchen utensil according to the present invention.

FIG. 4 is a side elevation of the present invention showing the embodiment which has the spiral portion.

DESCRIPTION OF THE PREFERRED EMBODIMENT

Figure 2A:
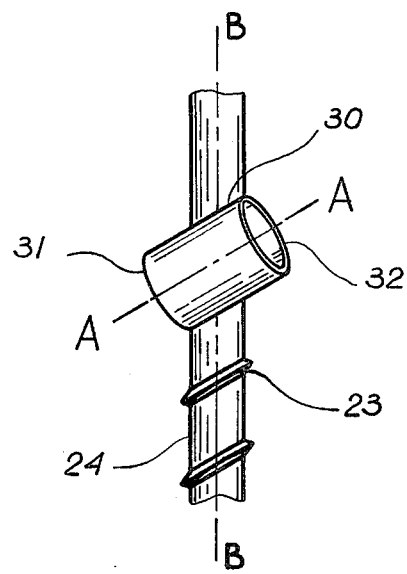
FIG. 2a is enlarged fragmentary elevation showing the cylindrical cutting member.

Referring now to the drawing in detail, a kitchen utensil according to the present invention is shown at numeral designation 20 of FIG. 1. This utensil has an elongated rod member 22 with a threaded end portion 24 and a middle portion 28. To facilitate penetration of the portion 24 into a body of a vegetable 35 where a hollow portion has to be produced a lowest end of the threaded portion 26 is sharpened. The substantially straight middle portion 28 is adapted as continuation of the threaded portion 24. A top plain end portion 29 is adapted to facilitate a rotation of the utensil and is disposed at an acute angel $\alpha$ to an axis B—B of the middle portion 28 and threaded portion 24 of the utensil. It is recommended that the angle shoud not exceed 45°.

A cutting member 30 is soldered, welded or by any other conventional means attached to a top part of the threaded portion 24. This cutting member is shown in details in FIG. 2.

In the preferred embodiment of the present invention (see FIG. 1 and FIG. 2a) the cutting member 30 is substantially cylindrical in a shape with a sharp front cutting edge 31 and a plain back edge 32. The cutting member 30 is attached to the top part of the threaded portion 24 in such manner that an axis of this member A—A is substantially parallel to the direction of threads 23 of the threaded member 24.

Figure 2B:
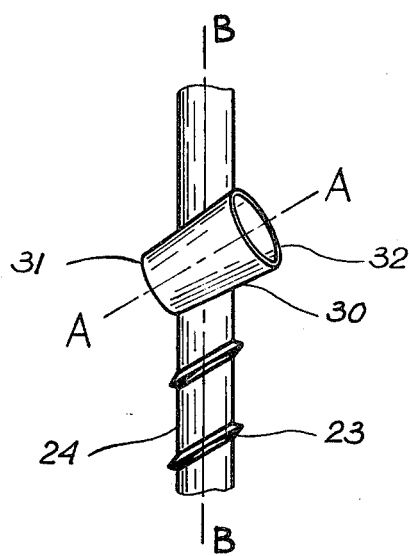
FIG. 2b is enlarged fragmentary elevation showing frusto-conical cutting member.

In the embodiment shown on FIG. 2b the cutting member 30 has a frusto-conical shape, wherein an axis thereof is substantially parallel to the directions of the threads.

Figure 2C:
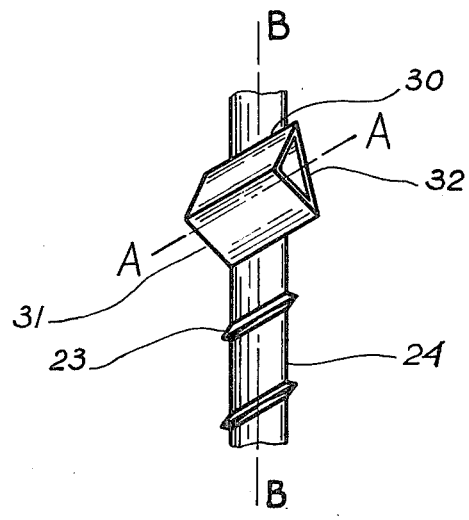
FIG. 2c is enlarged fragmentary elevation showing the cutting member triangular in crossection.

In FIG. 2c the cutting member 30 has a shape substantially triangular in a cross-section with the same requirement for the axis thereof.

According to the present invention the threads 23 of the threaded portion 24 and the central line of the cutting member A—A has to be disposed at the angle B equal 65° to the axis B—B of the middle portion 28 and threaded protion 24 of the utensil. Such requirement along with the requirement for a pitch of the thread 23 which has to be equal to 3/16" will secure fast and reliable production of a hollow part of a vegetable being stuffed. This data will secure a production of a strong and flexible spirals which are produced in the process of drilling of this hollow part.

Figure 3:
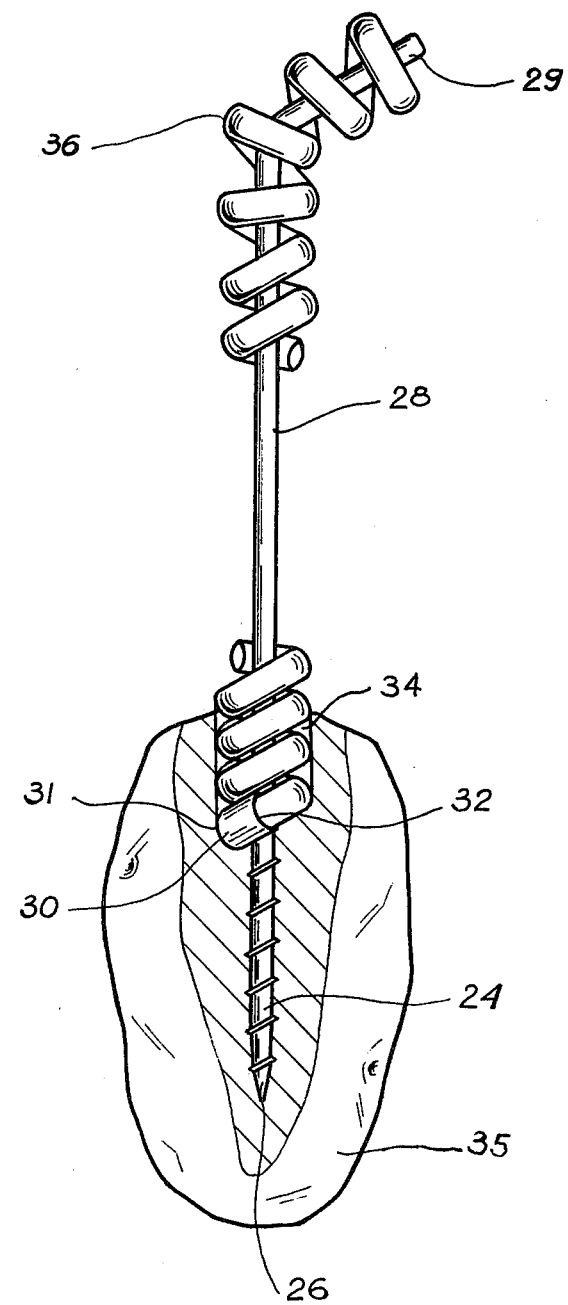
FIG. 3 is a view showing the kitchen utensil in action.

In operation (see FIG. 3) the lowest sharp end of the threaded part 26 has to be pressed into a vegetable 35 which has to be stuffed or from which spirals has to be produced, then the utensil should be turned in a clockwise direction until the desired depth of a hollow part 34 of this vegetable has been reached or desired length of the spiral has been cut. As it is clearly shown on FIG. 3 during a rotation of the utensil 20 about an axis of the middle portion the front cutting edge 31 of the cutting member 30 penetrates into a vegetable or food article 35 and produces the hollow region as a result of the rotation and penetration of the cutting member 30 inside of the food article. The material removed from this hollow region during the formation of this region passes through the aperture of the cutting member 30 and because of the rotation of the utensil defines spirally shaped members 36 which move longitudinally having the axis of the middle portion 28 and plain end portion 29 as a longitudinal axis of such spirally shaped members 36. During an operation the front cutting edge 31 of the cutting member 30 penetrates into a body of a vegetable and cuts spirals which are in a cross-section have a configuration which is substantially complimentary to the cross-section of the cutting member.

During the process of drilling of hollow part 34 of a vegetable a spiral 36 which has been cut will move upwardly along the middle portion 28 and the plain end portion 29.

The spiral 36 uses the portions 28 and 29 as a support. In view of substantial length of the straight middle portion 28 and a slight angel $\alpha$ a produced spiral can reach a significant length without breaking.

In the embodiment of the present invention which is shown in FIG. 4 the kitchen utensil instead of the threaded portion has a spiral portion 38.

Although the present invention has been described with reference to particular embodiments and examples, it will be apparent to those skilled in the art that variations and modifications can be substituded therefor without departing from the principles and true spirit of the invention.

I claim:

1. A kitchen utensil for producing a hollow region in certain food articles and spirally shaped members from a material removed from said region comprising:

an elongated rod member having a threaded end portion, a substantially straight elongated middle portion connected to the threaded end portion and a plain end portion disposed at an angle to the middle portion;

a cutting member having a front cutting edge, a back edge and an aperture going there through from the front cutting edge to the back edge, the cutting member being fixedly attached to the threaded end portion of the elongated rod member in such manner that an axis of the aperture is substantially parallel to the directions of threads of the threaded end portion;

the height of said elongated middle portion is of sufficient length such that during a rotation of the utensil about an axis of the middle portion the front cutting edge penetrates into the food article producing the hollow region and the material removed from said region as said region is formed defines spirally shaped members which move longitudinally having the axis of the middle portion and plain end portion as a longitudinal axis of said spirally shaped members.

2. A kitchen utensil according to claim 1, wherein the cutting member is substantially cylindrical in a shape.

3. A kitchen utensil according to claim 1, wherein the cutting member has frusto-conical shape.

4. A kitchen utensil according to claim 1, wherein the cutting member is substantially triangular in a cross-section.

5. A kitchen utensil according to claims 2, 3, or 4, wherein the threads are disposed at the angle of 65° to a central axis of the threaded and middle portions.

* * * * *